United States Patent
Huang et al.

(10) Patent No.: US 7,502,315 B2
(45) Date of Patent: Mar. 10, 2009

(54) METHOD FOR HYBRID NETWORK PLANNING

(75) Inventors: Baosheng D. Huang, Bridgewater, NJ (US); Wen-Jui Li, Middletown, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 789 days.

(21) Appl. No.: 10/721,556

(22) Filed: Nov. 25, 2003

(65) Prior Publication Data

US 2004/0105389 A1 Jun. 3, 2004

Related U.S. Application Data

(63) Continuation of application No. 09/469,172, filed on Dec. 21, 1999, now abandoned.

(60) Provisional application No. 60/113,168, filed on Dec. 21, 1998.

(51) Int. Cl.
*H04J 3/24* (2006.01)
*H04J 1/16* (2006.01)
*H04L 12/56* (2006.01)
*G02F 1/00* (2006.01)

(52) U.S. Cl. .................. 370/228; 370/409; 370/535; 398/5

(58) Field of Classification Search .................. None
See application file for complete search history.

(56) References Cited

U.S. PATENT DOCUMENTS

| | | | |
|---|---|---|---|
| 5,101,451 A | | 3/1992 | Ash et al. |
| 5,216,591 A | * | 6/1993 | Nemirovsky et al. ........... 705/8 |
| 5,381,982 A | * | 1/1995 | Adamski ................. 242/541.3 |
| 5,392,344 A | | 2/1995 | Ash et al. |
| 5,444,693 A | * | 8/1995 | Arslan et al. ................. 370/221 |
| 5,629,938 A | | 5/1997 | Cerciello et al. |
| 5,859,836 A | | 1/1999 | Eslambolchi |
| 5,905,712 A | * | 5/1999 | Cresswell et al. ............ 370/238 |
| 6,085,238 A | * | 7/2000 | Yuasa et al. .................. 709/223 |
| 6,097,722 A | * | 8/2000 | Graham et al. ......... 370/395.21 |
| 6,195,367 B1 | * | 2/2001 | Jakobik et al. .............. 370/535 |
| 6,356,546 B1 | * | 3/2002 | Beshai ....................... 370/358 |
| 6,404,735 B1 | * | 6/2002 | Beshai et al. ............... 370/230 |

OTHER PUBLICATIONS

T. Wu et al., Fiber Network Service Survivability, ISBN 0890064695, Artech House Publisher, Dec. 1992, Chapters 1, 2 and 4.

G. Ash et al., Real Time Network Routing in the AT&T Network, IEEE Global Telecommunications Conference, Dec. 6-9, 1992, Orlando, FL, pp. 802-809.

M. Pioro, Robust Design Problems in Telecommunication Networks, ITC 15, V. Ramaswamy and P.E. Wirth Editors, 1997 Elsevier Science B.V., pp. 1067-1076.

(Continued)

*Primary Examiner*—Melanie Jagannathan (57) ABSTRACT

A method of determining a path through a network. Structures in a network are grouped into structure groups, each structure group comprising at least two nodes. Virtual circuit information for every pair of nodes in the structure groups is determined, and connections between the structure groups is determined. A least cost path is determined from a first node to a second node using the virtual circuit information and connection information.

10 Claims, 8 Drawing Sheets

OTHER PUBLICATIONS

K. Chan et al., Analysis of Least Congested Path Routing in WDM Lightwave Networks, IEEE Infocom '94 Proceedings vol. 2, pp. 962-969, Jun. 12-16, 1994, Toronto, Ontario, Canada.

Doverspike et al., Network Design Sensitivity Studies for Use of Digital Cross-Connect Systems . . . , IEEE Jour. on Selected Areas in Comm., vol. 12, No. 1, Jan. 1994, p. 69-78.

D. Mitra et al., State-Dependent Routing on Symmetric Loss Networks with Trunk Reservations, IEEE Trans. on Comm., vol. 41, No. 2, Feb. 1993, pp. 400-411.

T. Wu et al., Survivable Network Architectures for Broad-Band Fiber Optic Networks, Jour. of Lightwave Technology, vol. 6, No. 11, Nov. 1988, pp. 1698-1709.

G. Ash et al., An Analytical Model for Adaptive Routing Networks, IEEE Trans. on Comm., vol. 41, No. 11, Nov. 1993, pp. 1748-1759.

D. Lynch et al. (editors), Internet Systems Handbook, Addison-Wesley Publishing, Jan. 1993, pp. 165-169.

B. Mukherjee, Optical Communication Networks, 1997, Chapter 10, McGraw Hill, ISBN-07-044435-8.

* cited by examiner

|  | edge(301-302) | edge(302-303) | edge(303-304) | edge(304-301) |
|---|---|---|---|---|
| slot 1-12 | unused | unused | used | used |
| slot 13-24 | unused | unused | unused | used |
| slot 25-36 | used | unused | used | unused |
| slot 37-48 | used | unused | used | unused |

METHOD FOR HYBRID NETWORK PLANNING

CROSS-REFERENCE TO PROVISIONAL APPLICATION

"This application is a continuation of prior application Ser. No. 09/469,172 filed Dec. 21, 1999, now abandoned which claims the benefit of U.S. Provisional Application Ser. No. 60/113,168, filed Dec. 21, 1998."

FIELD OF THE INVENTION

Embodiments of the present invention provide methods for planning a path through a network and for managing network capacity. More particularly, embodiments of the present invention provide methods for planning a path and managing capacity on a network in which the links can carry multiple channels.

BACKGROUND OF THE INVENTION

A network planning tool performs capacity planning at a systems level of traffic on a network, such as a fiber optic network, and a capacity management router performs network capacity management. For example, an Internet services communications company such as UUNET® may request to purchase use of a certain amount of network bandwidth on a fiber optic network for a period of time, such as use of an OC12 line from Fairfax, Va. to New York City for a one-year period beginning three months in the future. A network planning tool analyzes the network capacity already scheduled for that time period and finds the best path through the network that meets the request. Typically, the network planning tool attempts to find the path which meets the customer's demands but uses as little network resources as possible. A capacity planning router plans for future expansion of the network based on anticipated future usage. If the capacity planning router determines that future bandwidth demand Will overburden a particular part of the existing network, the network managers can consider adding new equipment to the network or "lighting" a fiber that is currently "dark."

A communication network contains a set of network structures with different topologies, such as mesh, closed ring, open ring (also known as linear chain), and point-to-point. Typically, a network structure contains a set of nodes each of which are connected by links to one or more of the other nodes. A link may contain, for example, one or more fiber-optic cables. In a fiber optic system, a node may be a cross-connect system, which can route signals, and may also be an add-drop multiplexer (ADM), which provides a network multiplexing function and is used to add/drop signals for the links. A network structure is a set of ADM nodes that are connected with each other through one or more links. A link may carry multiple channel signals. Network structures are inter-connected with each other through a cross-connect node or switching node. For example, the Synchronous Optical Network (SONET) and Synchronous Digital Hierarchy (SDH) network contain a set of SONET network structures such as SONET ADM rings and SONET point-to-point systems. SONET network structures may be connected with each other through a SONET cross-connect system (SONET DCS). Another example of a communication network is an optical network containing a set of optical network structures. Each optical structure could be an optical ADM ring or optical point-to-point system. Optical network structures may be connected through an optical cross-connect system or optical switching system.

Each link in a network structure may be able to simultaneously carry different signals over different channels. In a network using time division multiplexing, several low-speed signals may be combined to form a single high-speed signal by dividing the high-speed signal up into different time slots. A SONET/SDH network is an example of a time division multiplexing network. Such a low-speed signal satisfies a Time Slot Assignment (TSA) constraint in the ADM node when the signal traverses the network structure in the same slot. If a single slot is unavailable throughout the entire route within that structure, the low-speed signal needs to change from one slot to another by dropping out of the high-speed signal, leaving the ADM node (as well as this structure), entering a slot exchange terminal (such as the cross-connect node), and adding back into a new slot of the high-speed signal at the ADM terminal. Due to the time slot assignment constraint, such a slot change external to an ADM node is considered an expensive "hair pin" solution for transmitting a signal through different slots within a structure. In a system that uses dense wavelength division multiplexing (DWDM), a number of signals each using a different wavelength may be sent though the same optical cable at the same time. Such a signal may be sent at the same wavelength across all fibers that it traverses within that optical structure, in which case it satisfies a wavelength continuity constraint, or it may switch wavelengths. Optical cross-connect nodes are equipped with wavelength conversion equipment and may be used to connect these optical structures.

A network may contain, for example, more than ten thousand nodes and twenty thousand links. Because there can be millions of possible paths through such a network, it may be difficult to find the shortest path from a source node to a destination node. This problem is made more complicated because, as discussed above, each link in the network may have multiple channels and there are additional cost and equipment availability issues involved where network traffic changes from one channel to another channel. Thus, finding the best path through a network requires taking into account the availability of the different channels in the network.

Previous network planning tools and capacity management routers used techniques such as linear programming or mixed integer programming to determine the least cost path through the network. Such planning and management tools used a two step approach to planning a least cost path that involved initially determining a path through the network without regard to the availability of the corresponding channels in the links selected. Only after choosing a candidate route from a source to a destination would these systems consider whether corresponding channels were available in the links chosen. Such systems did not consider channel availability when performing the first step (i.e., when determining a candidate route) because such a consideration would make the determination too complex.

It would be advantageous to have a network planning and management tool that efficiently considers the availability of channels and the cost of channel interchange when determining the best path through the network, thereby performing routing and channel assignment at the same time.

SUMMARY OF THE INVENTION

Embodiments of the present invention provide methods for determining a path through a network by grouping network structures into structure groups, determining virtual circuit information for every pair of nodes in the structure groups, determining connections between said structure groups, and determining a least cost path between the nodes using the spare circuit information for the virtual circuit information and connection information. In one embodiment, the virtual circuit information includes information for each structure regarding whether a path using a common channel is available though the structure. In a further embodiment, the virtual circuit information includes two pseudo nodes for each group node. Methods of the present invention perform routing and channel assignment at the same time because the present invention considers the availability of channels within a structure group when determining the best path through the network. Use of the present invention provides a more efficient capacity planning tool and/or capacity management tool that is able to achieve real time network provisioning and just-in-time network capacity addition.

A further embodiment of the present invention determines a path through the network by also considering requests for multiple time periods and multiple bandwidths. A further embodiment may be used to plan paths that traverse, for example, SONET equipment, Plesiochronous digital hierarchy (PDH) equipment, and a hybrid of these types of equipment. In addition, one embodiment of the present invention also may be used to plan paths over a hybrid of network topologies, such as mesh, linear chain, and close ring. A further embodiment also considers requests for a certain bandwidth, routing preferences (e.g., ring required, SONET required), and loading priority. In addition, one embodiment of the present invention routes demand on a combination of express and local rings. A further embodiment also considers planned bandwidth for a structure for multiple time periods by representing the structure group as a slot-edge matrix for various time periods. This embodiment is used for multi-period capacity planning of a network.

DETAILED DESCRIPTION

Figure 1:
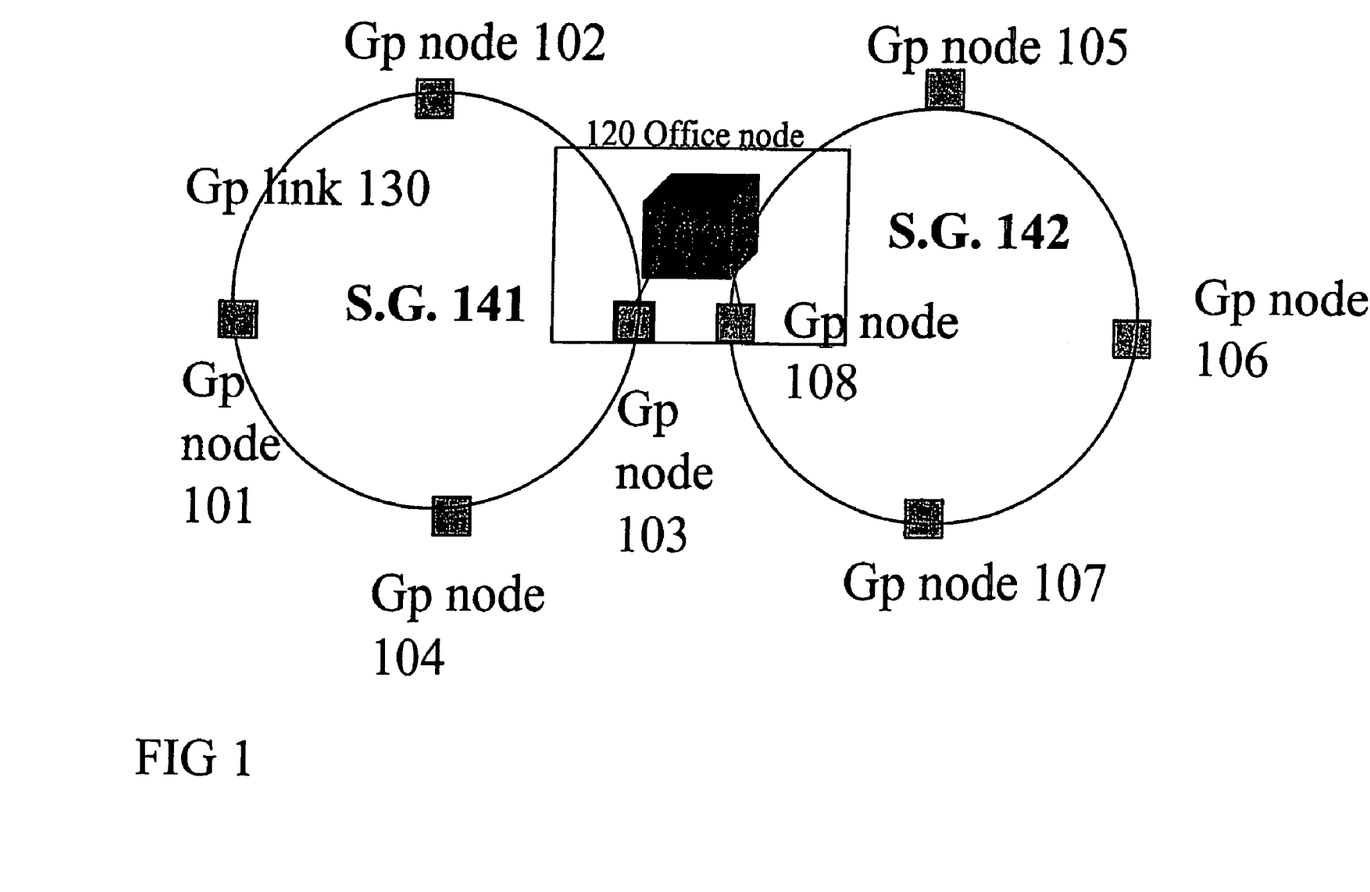
FIG. 1 is a block diagram of a part of a network containing structure groups in accordance with an embodiment of the present invention.

FIG. 1 is a block diagram of a part of a network containing structure groups in accordance with an embodiment of the present invention. FIG. 1 shows a portion of an optical network that contains group nodes 101, 102, 103, 104, 105, 106, 107, and 108. Each group node is connected to another node by a group link, such as the link 130 that connects group node 101 to group node 102. Each node contains at least an ADM. Node 120 is an office node and contains group node 103, group node 108, and cross-connect 109, which is also a group node. Each link may be bi-directional, in which case a signal may be sent across the link in either direction. For example, if the group link 130 is bi-directional, then a signal could be sent from group node 101 to group node 102 over group link 130, and a signal can be sent from node 102 to node 101 over link 130.

Group nodes 101, 102, 103, and 104 and the group links connecting them are part of structure group 141. Group nodes 105, 106, 107 and 108 and the group links connecting them are part of structure group 142. A structure group is a set of connected structures through which a signal can traverse without passing through a cross-connect. The structures in the same structure group may have the same set of ADM office locations. Typically, the structures in a structure group are all made by the same vendor and use the same protocol. A structure group may be constructed using a ring topology, such as structure groups 141 and 142. Because ring groups have self healing capability, they are considered to be the most reliable network topology for communication networks. A structure group may also be constructed, for example, according to a point-to-point topology or a linear chain topology. Linear chain topology, which is sometimes called an open ring, consists of a linear chain of add/drop multiplexers connected by links. A point-to-point topology is the simplest topology and consists of a linear chain with two nodes.

Ideally, a signal will be sent through a structure group on the same channel because a cost is incurred whenever a signal changes from one channel to another channel. For example, with reference to FIG. 1, assume that a signal is being sent from node 101 to node 103. As discussed above, the high-speed signal sent over a network may be divided into a number of lower-speed signals using time division multiplexing. In this case, each low-speed signal sent from node 101 to node 104 occupies a particular time slot. For example, if there were four time slots, a part of a first signal may be sent in slot 1, a part of a second signal may be sent in slot 2, a part of a third signal may be sent in slot 3, and slot 4 may be unused. In the next time frame, the next part of the first signal is sent in slot 1, the next part of the second signal is sent in slot 2, ect. If the first time slot is available from node 101 to 104, and the third time slot is available from node 104 to 103, a signal can be sent from node 101 to 103 using the first slot from node 101 to node 104 and using the third slot from node 104 to 103. To do so, the ADM at node 104 will have to drop out the signal from the first slot and add it into the third slot. A cost is incurred whenever an ADM has to add or drop a signal because of the ADM's low-speed plug-in and its associated cross-connected termination cost.

Whenever a signal leaves a structure group it must go through a cross-connect. Thus, additional costs are incurred when changing from one channel to another channel. Similar costs will be incurred whenever a signal traverses from one structure group to another structure group.

Figure 2:
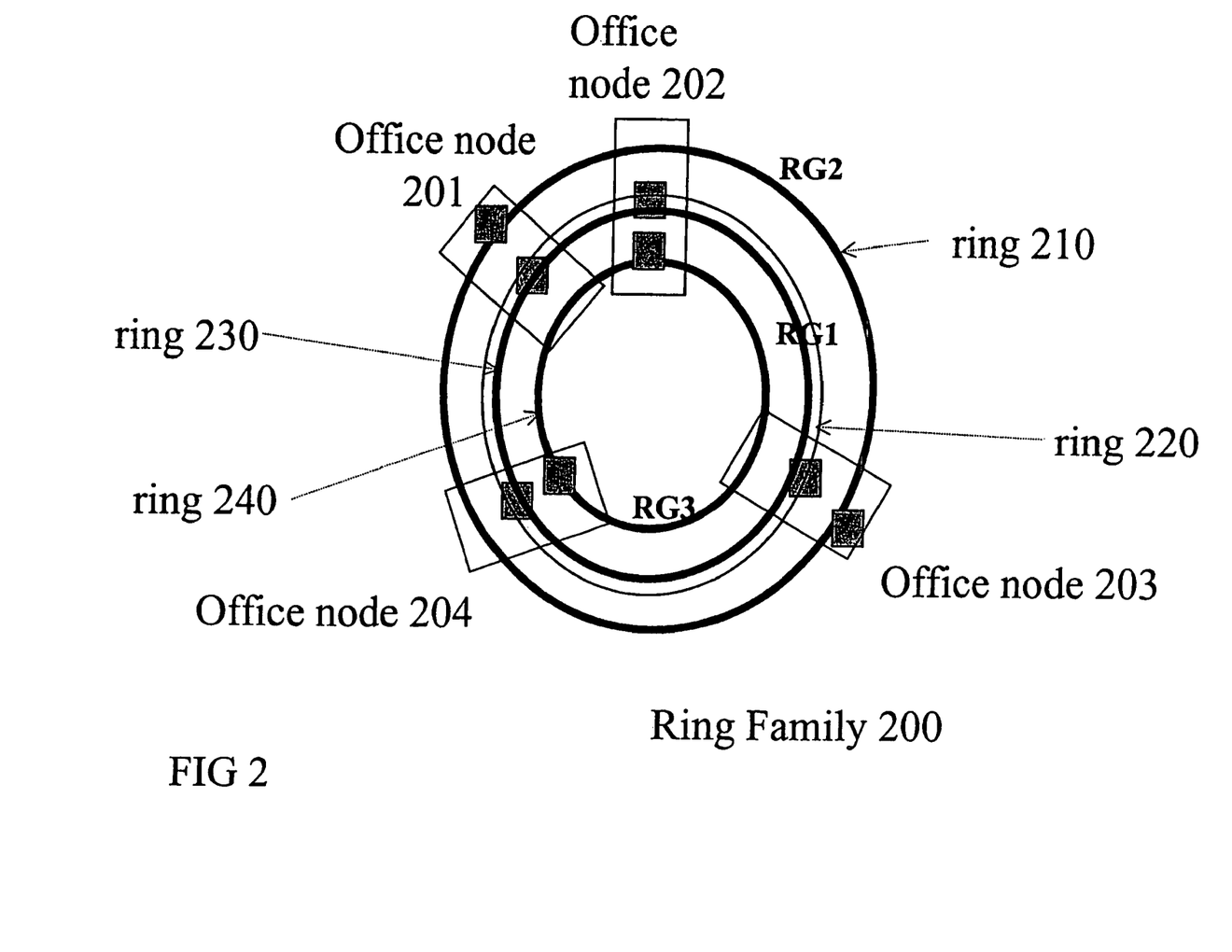
FIG. 2 is a block diagram of a ring family in accordance with an embodiment of the present invention.

FIG. 2 is a block diagram of a ring family in accordance with an embodiment of the present invention. A ring family contains the same set of office nodes. FIG. 2 shows ring family 200, which contains three structure groups, ring group RG1 with rings 220 and 230, ring group RG2 with ring 210, and ring group RG3 with ring 240. A ring group may be a stack of physical rings that reside on the same set of office nodes. Ring family 200 contains office node 201, 202, 203 and 204. Ring family 200 also contains a set of rings 210, 220, 230 and 240. Rings 220 and 230 contain a set of links connecting office nodes 201, 202, 203 and 204. Ring 210 is the outermost ring, and ring 240 is the innermost ring. In the example shown in FIG. 2, rings 210, 230, and 240 may be able to support OC1/3/12/48 service, and ring 220 may be able to support OC3 service. Ring 210 and 240 may be express rings which do not stop at every node, while ring 220 and 230 may be local rings which stop at every node.

Figure 3:
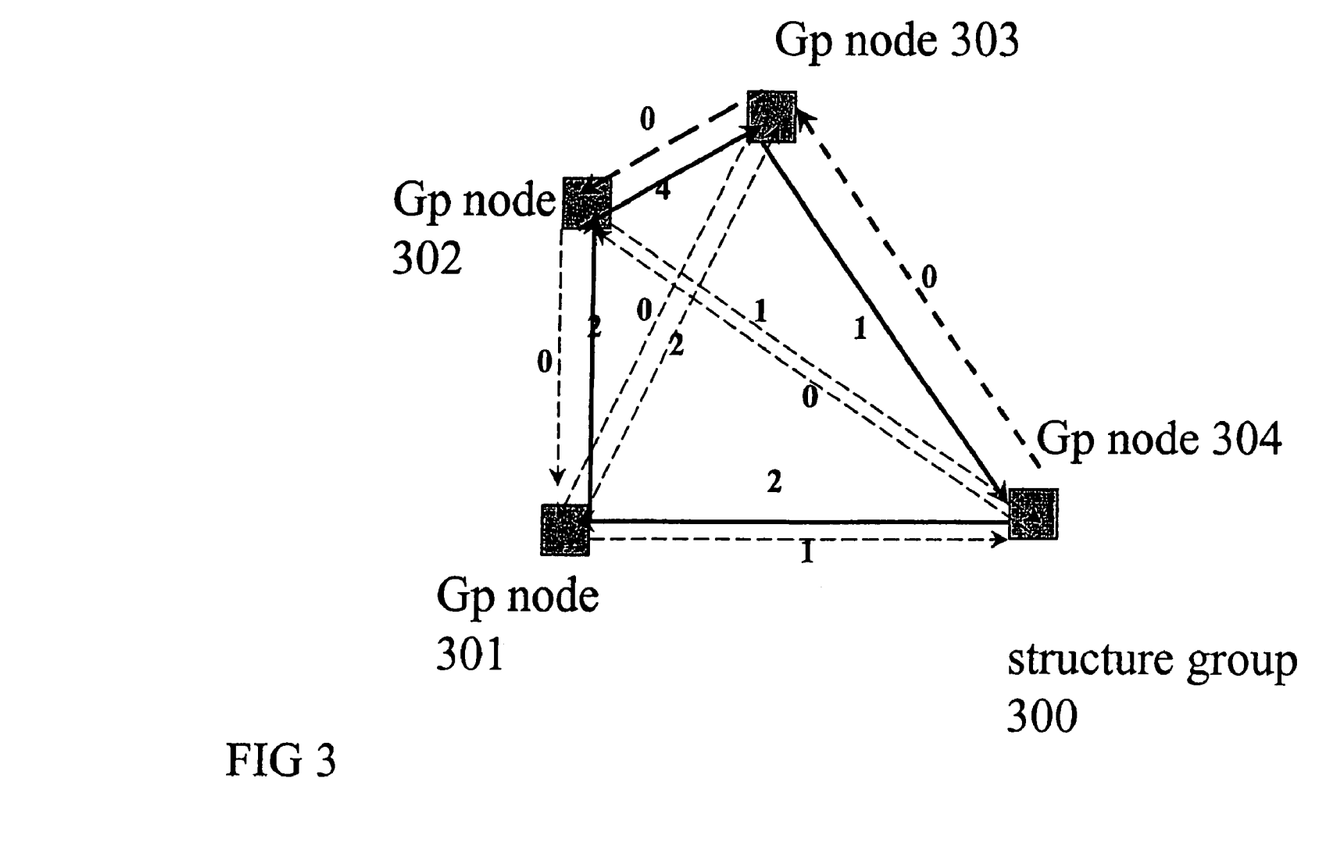
FIG. 3 is an equivalence graph showing virtual links for a structure group in accordance with an embodiment of the present invention.

FIG. 3 is an equivalence graph showing virtual links for a structure group in accordance with an embodiment of the present invention. Structure group 300 contains group node 301, group node 302, group node 303 and group node 304. Structure group 300 may correspond, for example, to structure group 141 of FIG. 1, in which case group nodes 301, 302, 303 and 304 of FIG. 3 may correspond to group nodes 101, 102, 103 and 104 of FIG 1. In this embodiment, node 301 is connected to node 302 by a group link, node 302 is connected to node 303 by a group link, node 303 is connected to node 304 by a group link, and node 304 is connected to node 301 by a group link. The group links are not shown in FIG. 3. The lines shown in FIG. 3 represent virtual links in a clockwise direction between nodes in structure group 300. Virtual links may be used to represent connections that may be made between two nodes in a structure group using one or more group links. The spare circuit value for a virtual link represents the number of connections through a structure group that may be made between two nodes without changing channels. Thus, the spare circuit value for a virtual link is based on the number of channels available (i.e., spare) between two nodes. For example, the solid line between node 301 and node 302 shows that the virtual link between these nodes in a clockwise direction has a spare circuit value of 2. Thus, in this example there are two channels available from node 301 to node 302 in a clockwise direction. If the link is a bi-direction transmission, the spare channel from node 302 to node 301 in the counter-clockwise direction is also value of 2. The dashed lines between adjacent nodes represents the virtual links from the source node to the destination node in a clockwise direction. For example, the dashed line from node 302 to node 301 represents the virtual link from 302→303→304→301. The dashed line from node 302 to node 301 shows that the virtual link from node 302 to node 301 in a clockwise direction has a spare circuit value of 0.

The dashed lines between node 301 and node 303 represent two virtual links from node 301 to 303 and from 303 to 301, respectively. Similarly, the dashed lines between nodes 302 and 304 represent two virtual links between node 302 and 304. The spare circuit value of a virtual link between node 301 and node 303 in the clockwise direction is equal to the number of channels that are available in both the link connecting node 301 to node 302 (in the clockwise direction) and the link connecting node 302 to node 303 (in the clockwise direction) that meets the time slot assignment constraint in SONET ADM equipment, or wavelength continuity constraint in optical ADM equipment. That is, the spare circuit value is the number of channels available in both links at the same slot (channel). FIG. 3 shows that the virtual link from node 301 to node 303 in the clockwise direction has a spare circuit value of 2.

Figure 4:
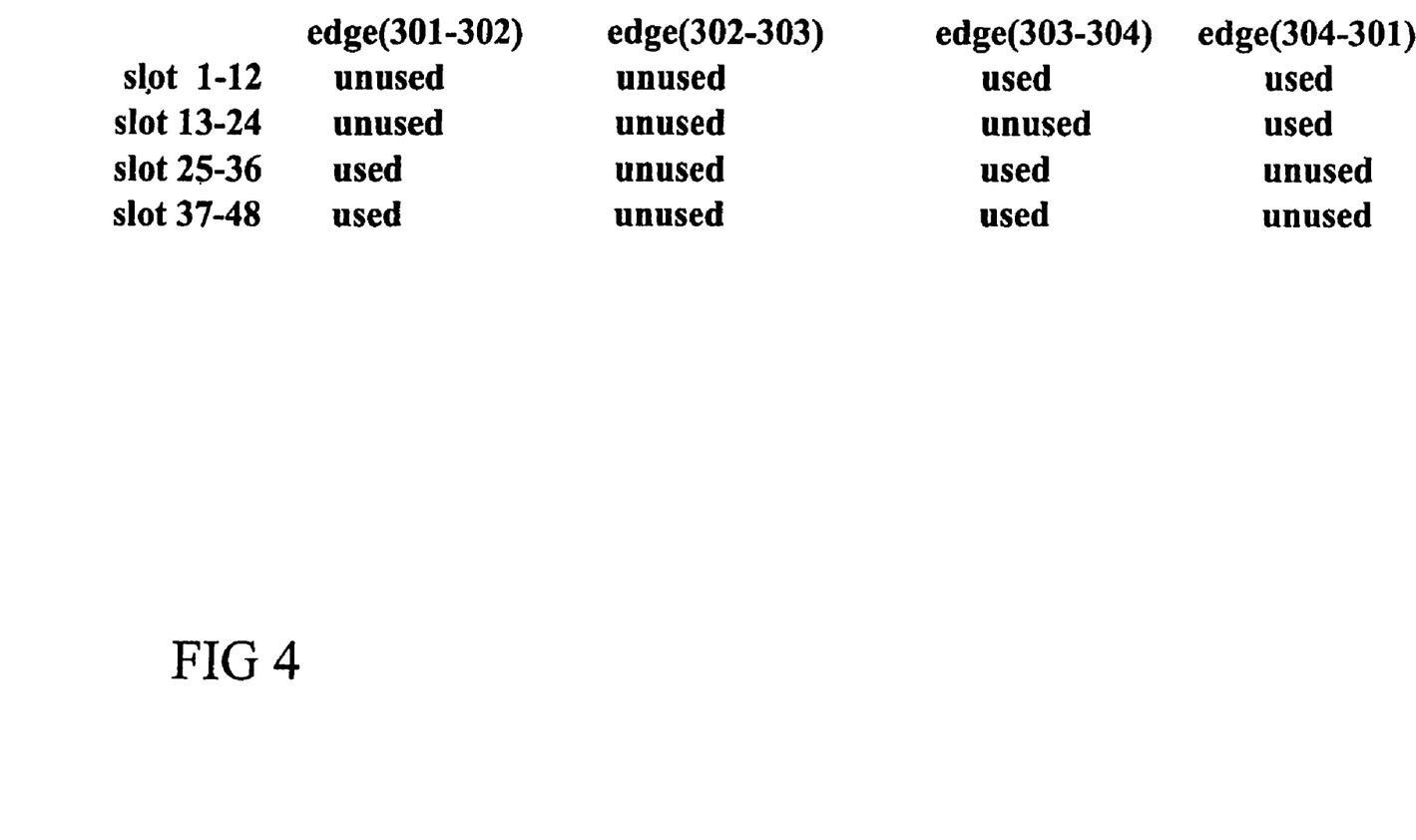
FIG. 4 is a slot-edge matrix for a structure group in accordance with an embodiment of the present invention.

FIG. 4 is a slot-edge matrix for a structure group in accordance with an embodiment of the present invention. The slot-edge matrix in FIG. 4 contains edge (or physical link) usage information regarding slots that are currently used or reserved for a given structure. This information may be used to determine the spare circuit value for the virtual links in that structure. According to an embodiment of the present invention, a network planning tool maintains a slot-edge matrix for each structure in the network. In one embodiment, a slot-edge matrix is maintained for each structure for various time periods. In a further embodiment, where a signal in a structure uses more than one slot, a channel may comprise a group of slots in the slot-edge matrix. For example, FIG. 4 may be the slot-edge matrix in the clockwise direction for an OC48 closed ring with four nodes (which has 48 slots) and the slots in FIG. 4 may be grouped into channels of 12 slots each in order to accommodate signals having a bandwidth of OC12.

FIG. 4 shows the channels available in the clockwise direction for edge 301-302, edge 302-303, edge 303-304, and edge 304-301. The edges in FIG. 4 may represent the links in the structure group of FIG. 3. For example, edge 301-302 may represent the link connecting node 301 to node 302 in FIG. 3. In FIG. 4, the designation "unused" represents a set of slots that are available, and the designation "used" represents that the slots are busy or reserved. For example, FIG. 4 shows that slots 1-12 are available in the clockwise direction along edge 301-302 and edge 302-303, and that slots 1-12 are not available in the clockwise direction along edge 303-304. In the example illustrated in FIG. 4, the slots available in the clockwise direction along edge 303-304 are slots 13-24, and the slots available in the clockwise direction along edge 304-301 are slots 25-36 and slots 37-48. In view of this slot-edge matrix, there are no virtual links in the clockwise direction from node 303 to node 301 because there is no channel that is available in the clockwise direction in both edge 303-304 and edge 304-301. Transmitting a signal in slots 13-24 along edge 303-304 and then in slots 25-36 (or 37-48) of edge 304-301 would be an expensive or sometime impossible hair pin solution because the signal would have to be dropped and added in the new channel. The impossibility may be due to the unavailability of low speed plug-in required for dropping/adding signals by the ADM. The absence of any spare virtual circuits in the clockwise direction along edge 303-301 may be represented in FIG. 3 by a 0 accompanying the dashed line from node 303 to node 301.

Figure 5:
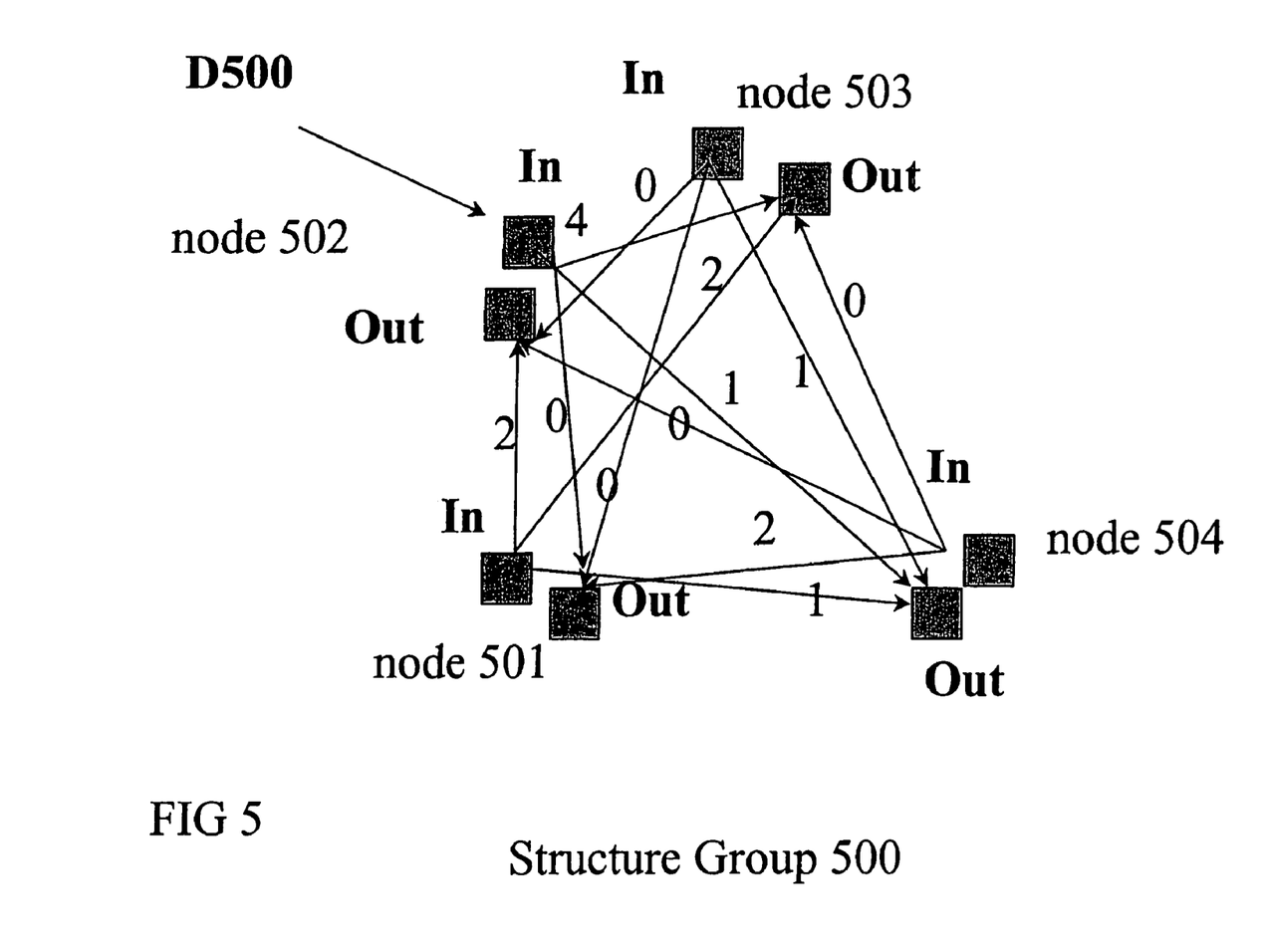
FIG. 5 is an equivalence graph showing pseudo links and pseudo nodes for a structure group in accordance with a further embodiment of the present invention.

FIG. 5 is an equivalence graph showing pseudo links and pseudo nodes for a structure group in accordance with a further embodiment of the present invention. Pseudo nodes and pseudo links may be created to differentiate between hair pin connections and non-hair pin connections. For each group node in a structure group, two pseudo nodes are created, one called an In-node and the other called an Out-node. In-nodes represent the node through which traffic is being "Added in" for a structure group. Out-nodes represents the node that traffic is to being "Dropped out" of a structure group. There are no connections from In-node to In-node, from Out-node to Out-node, or from Out-node to In-node. A pseudo link is a variation of a virtual link used to connect pseudo nodes.

FIG. 5 shows a structure group 500 that includes group nodes 501, 502, 503, and 504. Structure group 500 may correspond, for example, to structure group 141 of FIG. 1, in which case nodes 501, 502, 503 and 504 of FIG. 5 may correspond to nodes 101, 102, 103 and 104 of FIG. 1. Although the group links are not shown in FIG. 5, in this embodiment node 501 is connected to group node 502 by a group link, group node 502 is connected to group node 503 by a group link, group node 503 is connected to group node 504 by a group link, and group node 504 is connected to group node 501 by a group link. In FIG. 5, each group node is represented as two pseudo nodes, one of which is a pseudo In-node and the other of which is a pseudo Out-node. For example, node 501 is represented by pseudo node 501-In and pseudo node 501-Out. The lines shown in FIG. 5 represent pseudo links between the nodes in structure group 500. For example, the line between pseudo node 501-In and pseudo node 502-Out is a pseudo link between node 501 and node 502, and the line between pseudo node 501-In and pseudo node 503-Out is a pseudo link between node 501 and node 503. D500 represents a group node that sends a signal (i.e., a demand for a given bandwidth) that enters structure group 500 at pseudo node 502-In. D500 node also receives a signal from pseudo node 502-Out.

The spare circuit values in FIG. 5 (and FIG. 3) are given by the clockwise view. If the structure supports bi-directional transmission, then the number of spare circuits in the counter-clockwise direction from a node i to node j can be derived from the spare circuits in the clockwise direction from node j to node i. Thus, the counter-clockwise view can be derived from the clockwise view.

The pseudo In-nodes in FIG. 5 represent the entrance of a signal into structure group 500. For example, assume that structure group 500 is a SONET network using time division multiplexing. Pseudo node 502-In may then represent the adding of a signal at node 502. The pseudo Out-nodes in FIG. 5 represent the exiting of a signal from structure group 500. Using the example above, pseudo node 501-Out represents the dropping of a signal at node 501. In this embodiment, pseudo links are shown starting at a pseudo In-node because signals enter the structure group at an In-node. Similarly, in this embodiment pseudo links are shown ending at a pseudo Out-node because signals exit the structure group at an Out-node. A pseudo link connecting a pseudo In-node to a pseudo Out-node represents a route for a signal entering the system at the pseudo In-node and exiting the system at the pseudo Out-node. One situation when a signal exits the system at a pseudo Out-node is when the signal changes to another channel at that node. For example, the line from pseudo In-node 501 to pseudo Out-node 502 represents a signal that enters the structure group at node 501 and exits at node 502, such as a signal that is dropped at node 502. The same signal may then re-enter the structure group at pseudo node 502-In, for example if it is added back in another slot at node 502, and exit at pseudo node 503-Out. Each spare circuit for a pseudo link connecting two nodes which are not adjacent with each other needs to meet the time slot assignment constraint (i.e. the signal must stay in the same slot). For example, the pseudo link from pseudo node 501-In to pseudo node 503-Out represents a link whose circuits need to travels from node 501 to node 503 along the same channel. Such a signal, for example, passes through node 502 without being added or dropped.

Figure 6:
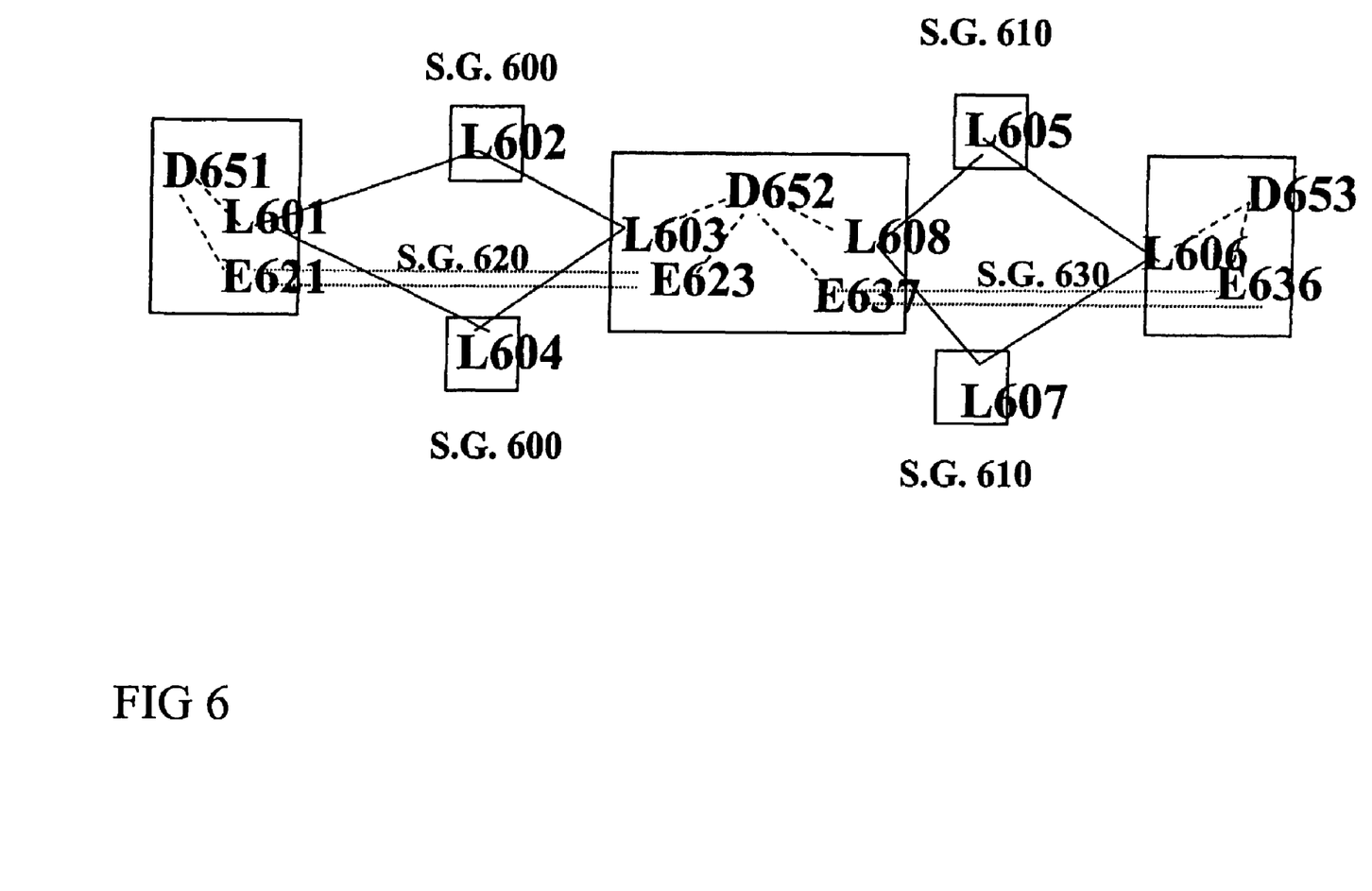
FIG. 6 is a block diagram of four structure groups in accordance with an embodiment of the present invention.

FIG. 6 is a block diagram of four structure groups in accordance with an embodiment of the present invention. Structure groups 600, 610, 620, and 630 in FIG. 6 are shown at the group node level. There are four structure groups, two at the west side (local group SG 600 and express group SG620) and two on the east side (local group SG610 and express group SG630) of the center office node. Each local structure group has four group nodes, each of which is represented by the designation L. Each express structure group has two nodes, both of which are represented by the designation E. Structure group 600 contains pseudo nodes L601, L602, L603 and L604. Similarly, structure group 610 contains pseudo nodes L605, L606, L607, and L608. Express structure group 620 contains pseudo nodes E621 and E623. Express structure group 630 contains pseudo nodes E636 and E637. Structure group 610 may correspond to ring 230 of FIG. 2 (the ring third from the outside) and structure group 620 may correspond to ring 210 of FIG. 2 (the outside ring). In this case, office node 201 of FIG. 2 may correspond to pseudo nodes L601 and E621, office node 202 may correspond to L602, office node 203 may correspond to L603 and E623, and office node 204 may correspond to L604.

D651 represents a group node that sends a signal (i.e., a demand for a given bandwidth) that enters structure group 600 or 620 at pseudo node L601 or E621. A demand from D651 to point D652 can use 3 different possible types of paths: express (E621→E623), local (L601→L1602→L603 or L601→L604→L603), and hair pin (L601→L602→hair pin→L602→L1603, or L601→L604→hair pin→L604→L603). A demand from D651 to D653 may have at least 9 possible paths. In practice, a network may have thousands of structure groups and each structure group may have up to 16 nodes. Because of the complexity of the route and slot assignment, two step algorithms have been used for solving this problem.

Figure 7:
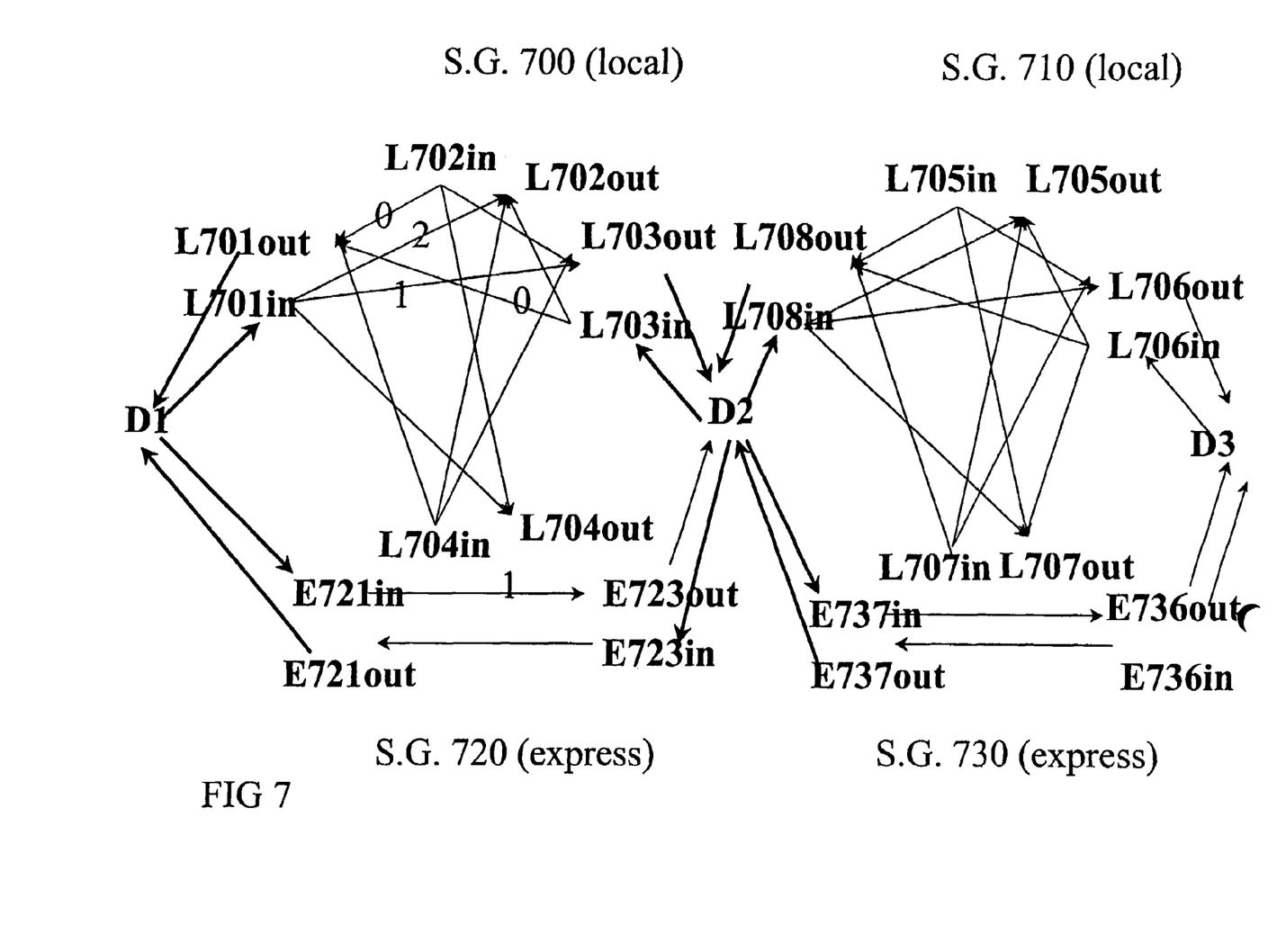
FIG. 7 is an equivalence graph showing pseudo links and pseudo nodes for four structure groups in accordance with an embodiment of the present invention.

FIG. 7 is an equivalence graph showing pseudo links and pseudo nodes for four structure groups in accordance with an embodiment of the present invention. FIG. 7 shows structure groups 700, 710, 720 and 730, which may correspond to structure groups 600, 610, 620 and 630 of FIG. 6. Structure groups 700 and 710 are local, and structure groups 720 and 730 are express.

Each node in structure groups 700, 710, 720, and 730 is represented by pseudo In-nodes and pseudo Out-nodes. An In-node corresponds to a route for a signal coming in to the structure group at that node, and an Out-node corresponds to a route for a signal exiting the structure group at that node. Express and local pseudo nodes correspond to express and local routes. For example, structure group 700 includes group node 701, which is shown in FIG. 7 as pseudo nodes L701in and L701out. Node 701 may correspond, for example, to node 101 of FIG. 1 or node 201 of FIG. 2. Pseudo node L701in corresponds to a signal that enters structure group 700 at node 701 and travels on a local path. Pseudo node E721in represents a signal that enters structure group 720 at node 721 and travels on an express path. Pseudo node L701 out represents a signal that travels to node 701 on a local path and exits structure group 700 at node 701, and pseudo node E721out represents a signal that travels to node 721 on an express path and exits structure group 720 at node 721. If node L701 corresponds to a node in RG1 (Ring Group 1) at office node 201 of FIG. 2, then a signal entering structure group 700 at pseudo node L701in and traveling along a local path to pseudo node L703out corresponds to a signal entering node 201 and traveling along a path (e.g., ring 220 or 230) to node 203. Alternatively, a path from D1→E721in→E723out corresponds to a signal that enters office node 201 at a node in RG2 of FIG. 2 and travels along express ring 210 (the outer ring) to office node 203.

There are no pseudo express nodes for node 702 because, in this example, an express ring does not stop at node 702. If node 701 and 702 correspond to nodes 201 and 202 that resides in RG1 of FIG. 2, then a signal entering structure group 700 at pseudo node L701in and traveling along a local path to pseudo node L702out corresponds to a signal that enters node 201 of FIG. 2 and travels along local ring 230 (the third ring from the center) to node 202. Structure group 700 in FIG. 7 also includes pseudo nodes L703out, L703in, L704out, and L704in. Structure group 710 includes pseudo nodes L705in, L705out, L706in, L706out, L707in, L707out, L708in, and L708out. In FIG. 7, D1 represents a digital cross-connect node where a signal (i.e., a demand for a given bandwidth) may enter structure group 700 at node 701 in or exit structure group 700 at 701 out. D2 represents a signal that may enter or exit structure group 700 at 703in or 703out, and may enter or exit structure group 710 at 708in or 708out. D2 may also enter or exit structure group 720 at node 723in or 723out, and may enter or exit structure group 730 at node 737in or 737out. D3 represents a signal that may enter or exit structure group 710 at node 706in or 706out, and may enter or exit structure group at node 736in or 736out.

FIG. 7 also shows certain spare circuit values for the pseudo links for structure group 700. The spare circuit values for structure group 700 shown in FIG. 7 correspond to the spare circuit values for structure group 300 shown in FIG. 3, except that FIG. 7 represents the nodes as two pseudo nodes (In and Out). For example, the spare circuit value for the virtual link from node 301 to node 302 in a clockwise direction is 2, and the spare circuit value for the pseudo link for pseudo node L701in to L702out is also 2. Similarly, the spare circuit value for the virtual link from node 302 to node 301 in a clockwise direction is 0, and the spare circuit value for the pseudo link from pseudo node L702in to L701 out is also 0. The spare circuit value of virtual link from node 301 to 303, which equal 2, corresponds to the sum of the spare circuit value from pseudo link L701in to L703out, which is 1, and the spare circuit value from pseudo link E321 to E323, which is 1.

In this example, the least cost path from D1 to D2 is the express route, represented by D1→E721in→E723out→D2. The next least cost path is to use the local structure group route without a hair pin, represented by D1→L701in→L703out→D2. This route will go through an intermediate ADM at its high speed. This intermediate ADM could be in L702 or L704, depending on clockwise or counter-clockwise direction. That is, the route D1→L701in→L703out→D2 could go from L701in to L703out in the clockwise direction (through L702) or in the counter-clockwise direction (though L704). The third possible route will be one with a hair pin solution. This may be a route from D1→L701 in→L702 out→hair pin→L702in→L703 out→D2.

In one embodiment of the present invention, each node and link may be represented by entries in a database. These values may be used by a network planning tool and/or capacity management router to determine paths through the network. According to a further embodiment, the spare circuit values for each structure group may be maintained in a data base and used by the network planning tool and/or capacity management router. These values may be, for example, the spare circuit values shown in FIG. 3. In addition, these values may be dynamically updated when a network planning tool allocates a path or when a capacity management router accounts for a future path. In one embodiment, the database records the spare circuit values for each time period, such as for example recording the spare circuit values on a week-to-week or month-to-month basis. In a further embodiment, the spare circuit values for each link may be associated with a priority. For example, paths that are reserved on a high priority basis may be distinguishable from paths reserved on a low priority basis.

In a further embodiment, the database may contain two pseudo node entries for each group node. These entries may correspond, for example, to the pseudo node values shown in FIG. 5. In a further embodiment, the database distinguishes between local pseudo links and express pseudo links, as for example is shown in FIG. 7. In a further embodiment of the present invention, the entry for each link in the database may be associated with a cost. Such costs may be based, for example, on the length of the link or the remoteness of the area served by the link. In a still further embodiment, the type of structure that a link resides in (e.g., ring, linear chain, ect.) and the type of equipment used in the structure (e.g., SONET, PDH, ect.) may be associated with the entry for the link.

Figure 8:
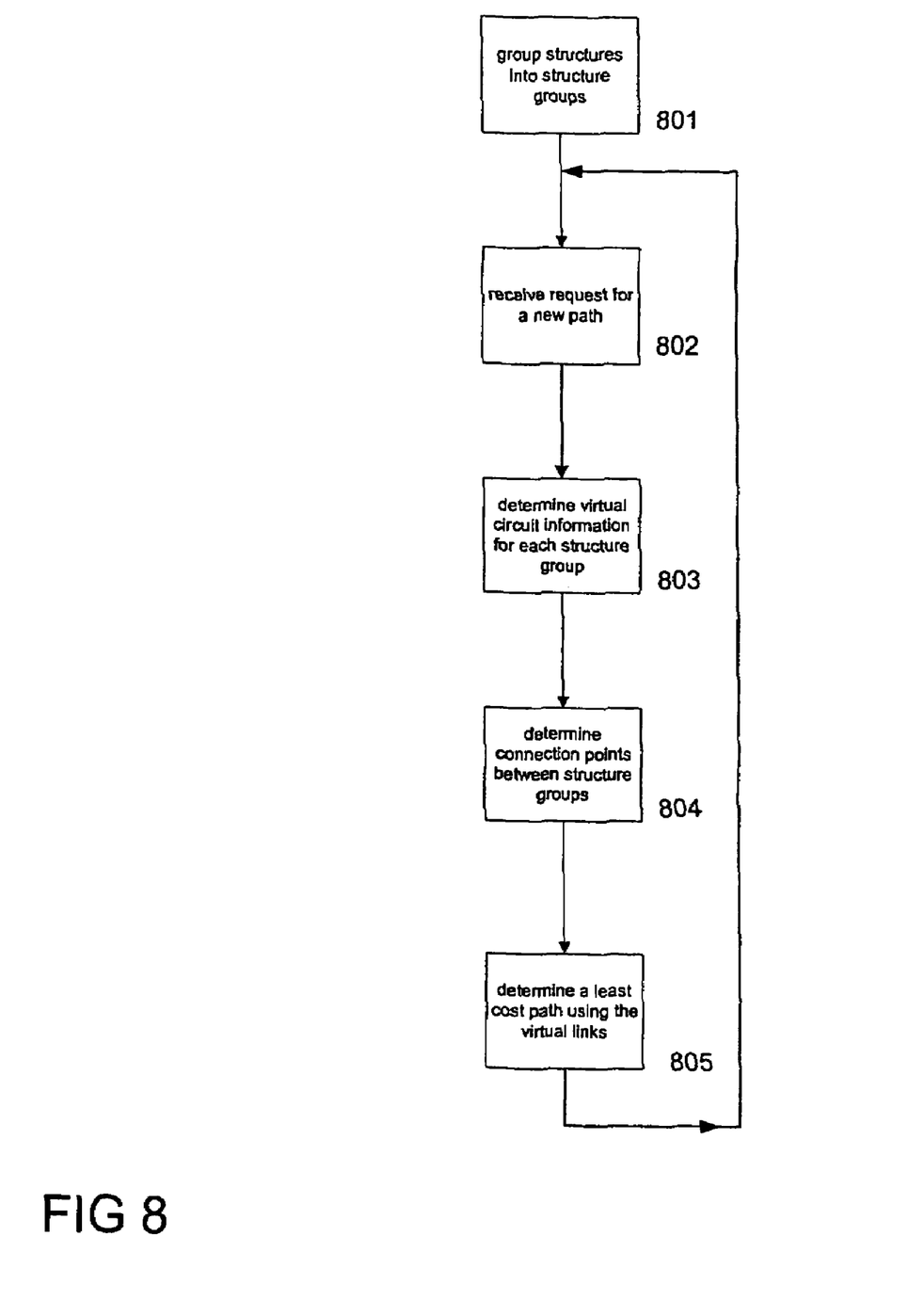
FIG. 8 is a flow diagram of a method for determining a path through the network in accordance with an embodiment of the present invention.

FIG. 8 is a flow diagram of a method for determining a path through the network in accordance with an embodiment of the present invention. The method shown in FIG. 8 could be used, for example, by a network planning tool to plan a new path through a network from a source to a destination. At 801, the structures in the network are grouped into structure groups. At 802, a request for a path is received. This might be a request, for example, to use an OC12 line from Fairfax, Va. to New York City for a one-year period beginning three months in the future. At 803, virtual circuit information for each structure group in the network is determined. This information may include pseudo link and pseudo node information for the structure group. At 804, the connection points between the structure groups is determined. For example, with reference to FIG. 7, the connection points between structure groups 700, 710, 720 and 730 are determined (e.g., D1, D2, D3). At 805, a least cost path from the source to the destination is determined using the virtual circuit information. The least cost path may be determined, for example, using a Dijkstra shortest path algorithm with cost as the "distance metric". The Dijkstra algorithm is a well known algorithm for finding the shortest path from a source to a destination, and it is discussed for example in Daniel C. Lynch & Marshall T. Rose, INTERNET SYSTEMS HANDBOOK 165-169 (1993). The Dijksta algorithm is a recursive algorithm that uses a data base representing the costs for traversing a network. The method of the present invention may also be used with other shortest path algorithms, such as depth first or breadth first algorithms.

In one embodiment, there is a cost associated with each pseudo link and pseudo node visited on a potential path. In this embodiment, the least cost algorithm considers the costs associated with each pseudo link and pseudo node. The cost of a link may be related to the length of the link. In a further embodiment, the cost of a pseudo link is increased for a potential path if the signal must change channels at that link. The channel may be, for example, a time slot channel or a frequency channel. The availability of a channel may be determined based on the slot-edge matrix for a structure group. In a further embodiment, the cost of an express link is less than the cost of an local link. In another embodiment, a request for a path may specify the type of equipment requested, and the least cost algorithm considers the type of equipment requested when determining a path through the network. In another embodiment, a request for a path may specify a bandwidth requested, and the least cost path algorithm considers the bandwidth requested when determining a path. In a further embodiment, the slot-edge matrixes are updated to reflect that the new path has been reserved.

After step 805 in FIG. 8, a new request for a path through a network may be processed at step 802.

Embodiments of the present invention provide methods for efficiently considering the availability of channels and the cost of channel interchange when determining the best path through a network. In one embodiment, a network is grouped into structure groups, the number of spare circuits on each pseudo link between every two nodes in a structure group is determined, and a least cost path between the nodes using the spare circuit information for the pseudo links is determined. The methods of the present invention may be used in a network planning tool to perform capacity planning at a systems level of traffic on a network. Because methods of the present invention perform routing and channel assignment at the same time, a network planning tool using the present invention more efficiently achieves routing and channel assignment. For example, when implemented on a UNIX based workstation with 2 Giga bytes or memory, a network planning tool that uses the present invention can route and assign the slot for over 5,000 STS1/3/12/48 demands onto a network transport model within one hour.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, although embodiments relate channels to slots in the time division multiplexing context, a channel is not limited to slots. For example, a channel may also relate to a frequency in the wavelength division mutliplexing context. In addition, although embodiments show structure groups having a ring topology, the methods disclosed herein may also be used with other topologies, such as linear chain.

What is claimed is:

1. A method of planning a path through a network, comprising:
   receiving a request for a path through a network of structure groups between a source node and a sink node;
   determining virtual circuit information for each structure group in said network;
   determining a spare circuit value for each structure group using said virtual circuit information, wherein said spare circuit value represents the number of potential connections through a structure group between the source node and the sink node without changing channels; and
   determining a path through said network using said virtual circuit information and said spare circuit value, wherein the virtual circuit information includes the number of paths using a common channel through said structure group between any pair of nodes, and wherein a slot-edge matrix is maintained for each data structure, and wherein the availability of a channel is determined based on said slot-edge matrix.

2. The method of claim 1, wherein said request also includes a time period requested, wherein a slot-edge matrix is maintained for various requestable time periods and wherein the availability of a channel is determined based on the slot-edge matrix for the time frame requested.

3. The method of claim 1, wherein said virtual circuit information for each path through a structure group includes the number of nodes visited on said path.

4. The method of claim 1, wherein said request includes the type of service desired, and wherein said step of determining a path through said network selects a path using the desired service type.

5. The method of claim 4, wherein said type of service may be SONET service.

6. The method of claim 1, wherein said network is a fiber-optic network.

7. The method of claim 1, wherein said virtual circuit information includes two pseudo nodes for each group node.

8. The method of claim 1, wherein nodes in said network may be connected by links, and wherein said virtual circuit information is determined using a data set containing information on the availability of channels in said links.

9. The method of claim 8, further comprising the step of updating said data set to reflect that said path is no longer available.

10. The method of claim 1, wherein said request includes the bandwidth desired, and wherein a path through a structure group is available only if a path having the desired bandwidth is available.

* * * * *